Feb. 28, 1950 L. W. PARKER 2,498,705

ELECTRONIC COLOR TELEVISION

Filed July 2, 1947 2 Sheets-Sheet 1

INVENTOR
Louis W. Parker
BY Robert Harding Jr.
ATTORNEY

Feb. 28, 1950

L. W. PARKER 2,498,705

ELECTRONIC COLOR TELEVISION

Filed July 2, 1947

2 Sheets-Sheet 2

INVENTOR
Louis W. Parker
BY Robert Harding Jr.
ATTORNEY atented Feb. 28, 1950

2,498,705

UNITED STATES PATENT OFFICE 2,498,705

ELECTRONIC COLOR TELEVISION

Louis W. Parker, Little Neck, N. Y., assignor to International Standard Electric Corporation, New York, N. Y., a corporation of Delaware Application July 2, 1947, Serial No. 758,689

6 Claims. (Cl. 250—164)

This invention relates to television reception and more particularly to the production of television pictures in natural colors on a color grid screen in a cathode ray tube.

An object of this invention is to produce such color pictures by using only electrical equipment.

Another object of this invention is to provide a color grid type of fluorescent screen in a cathode ray tube in which substantially all of the screen area may luminesce in each picture scanning cycle thereby most effectively using the light producing properties of the screen.

A further object of this invention is to provide a fluorescent screen in which the fluorescent persistence of the screen material can be made longer than is the case with certain conventional systems.

The principle of reproducing images of objects in three fundamental colors and presenting them in such rapid succession that they seem to mix and create all possible colors, is well known. This invention makes use of this principle.

A more detailed description of the invention follows and is illustrated in the accompanying drawing.

Figure 4:
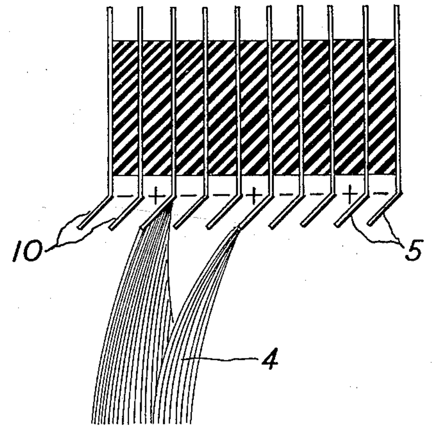

Fig. 4 diagrammatically shows a portion of an improved color grid screen and a cathode ray as it scans an elemental area thereof; and Figs. 5, 6, 7, and 8 show top, front, side and partial section views of the construction details of such an improved screen.

Similar reference characters on the different drawing figures refer to corresponding parts.

Figure 1:
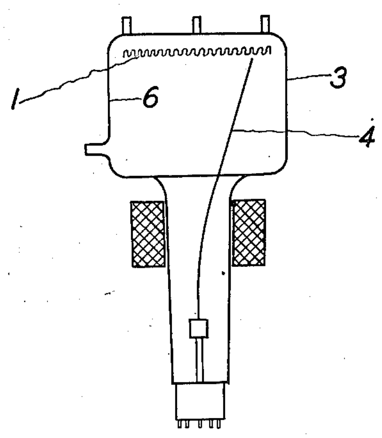
Fig. 1 is a simplified illustration of the invention.

In Fig. 1, a simplified illustration of the color grid screen and cathode ray tube arrangement, the screen 1 comprises three interlaced grids of elements 2 located in one end of a cathode ray tube 3 which in its construction resembles an iconoscope. On the frontal surface of the grids the pictures are reproduced in three primary or fundamental colors. By applying varying amounts of D. C. potentials to these grids, it is possible to direct the electron stream 4 to impinge on any one of these grids while avoiding the others. Groups of these grids are coated with different fluorescent material so that it is possible to obtain a different color light from each of them. In this manner the above mentioned three primary colors may be generated, which colors when suitably mixed create all of the possible color variations. The image field of the fluorescent screen is rapidly scanned by the cathode ray beam operated under the control of a conventional circuit.

Figure 2:
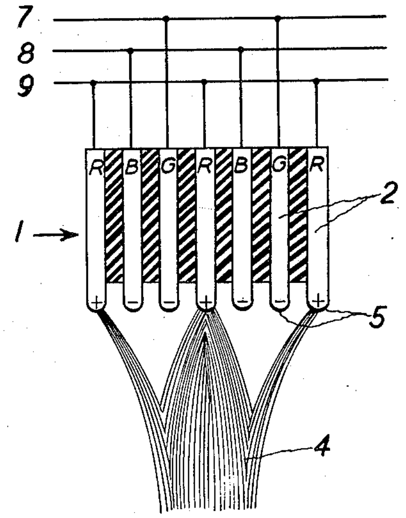
Figs. 2 and 3 show a portion of a color grid screen system and a cathode ray as it scans elemental areas of the screen.
Figure 3:
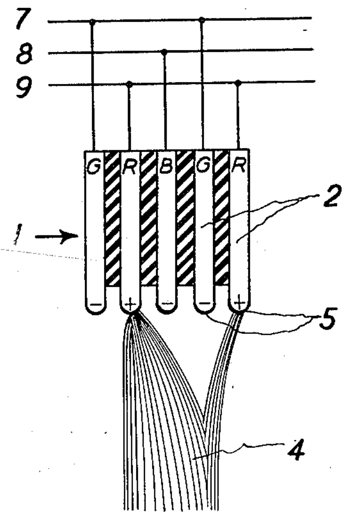

A detailed illustration of the grid systems and the phenomenon taking place at the three interlaced grids is shown in Figs. 2 and 3. In this figure the grids are shown composed of the rounded edges of metal plate elements 2 covered with the proper fluorescent materials 5. Each plate is insulated from its neighbor but every third one is electrically connected to each other in parallel as shown by circuits 7, 8, and 9, and to any suitable outside source of adjustable potential.

This outside source of potential serves the purpose of switching the electron stream from one grid to the other. It consists of square top waves, each of them having a duration of one picture frame, for example $1/120$ second. Aquadag coating 6 on the inside of the glass envelope is the second anode of the tube. The positive potential on picture grid 1 serves as the conventional accelerators used in CR tubes.

The elements 2 of each of the three groups of grids are shown marked by letters R (red), B (blue), and G (green). At the instant shown grids R are positive with respect to the potential of the electron stream, while grids B and G are negative. Electron beam 4 is approximately as wide as the distance between three successive grids. In Fig. 2 the middle of this electron beam is in alignment with an element of the positively charged grid. Nearly all of the electrons impinge on an element of the grid having positive potential. In Fig. 3 the stream is about to leave an element of the positively charged grid and is shown to split in two. In view of the fact that one picture elemental area is about as wide as the electron stream, this splitting does not represent appreciable loss of picture quality. In a practical case when the picture size is 10 inches wide, there may be 66 picture elements to the inch, which gives approximately 200 screen grids per inch. Each of these grids may be approximately 0.0035 inch in thickness, spaced 0.003 inch apart. The potential difference between grids may be of the order of 500 volts.

One disadvantage of the grid structure above described is the fact that there is almost as much blank space needed for insulation between plates as for the thickness of a plate. This reduces the picture brilliance. To improve this situation a better design of the grid is diagrammatically shown on Fig. 4. These grids are shown as made of relatively thin metal sheets 10 but their operating edges are bent about 45 degrees to the surface of the picture. The sheets may be about half an inch wide and 0.002 inch thick with 0.006 inch of spacing insulating material between them. They are held solidly together by any suitable clamping means. The frontal side of the bent portion of the elements is coated with fluorescent material 5. The advantage of this construction is the greater insulating space available in addition to the elimination of the above mentioned blank spaces in the screen front. A disadvantage is that the picture cannot be viewed from the direction of the bent edges of the grids. This however does not matter if the picture is projected. When using a Schmidt optical system the tube construction shown in Fig. 1 may be dispensed with in favor of the conventional centered construction. This optical system makes use of the rays coming on an angle, therefore the obstruction of the light by the gun is not a disadvantage.

The use of any optical system to project the picture has an additional advantage. The sharpness of optical focus may be made such that it is able to resolve one picture element but not one color element. This can be done since the color element is ⅓ as large as a picture element. In this way the eye is not depended on to mix adjacent color elements.

Figure 5:
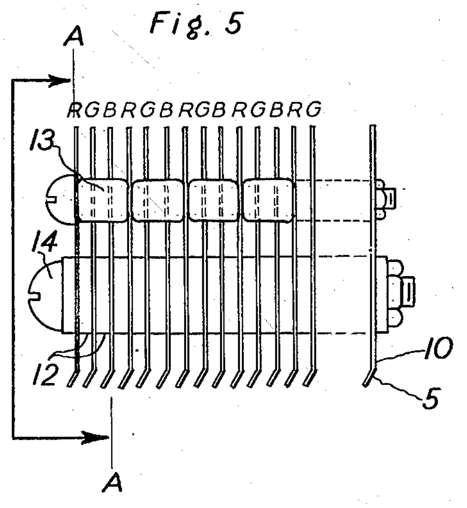
Figure 6:
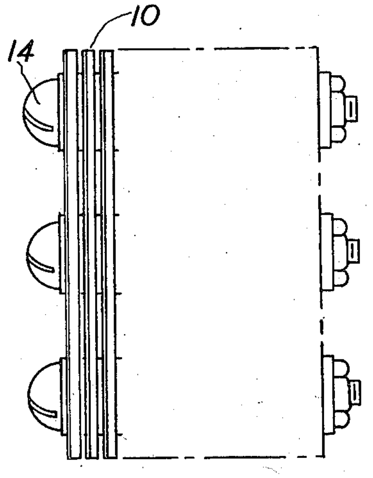
Figure 7:
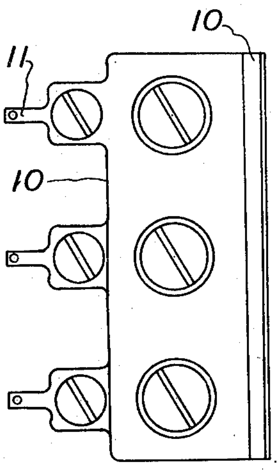
Figure 8:
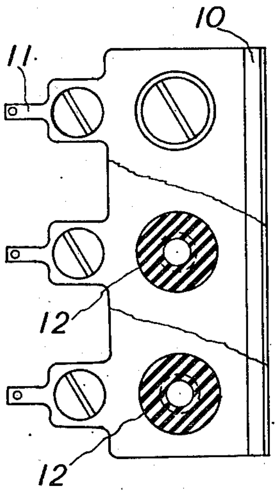

Construction details of such an improved screen are shown in Figs. 5, 6, 7, and 8, showing top, front, side and broken sectional views. Fig. 8 is a broken end view, looking in the direction of the arrows A—A in Fig. 5, showing parts of the first two plate elements broken away. The plate elements 10 with terminal extensions 11 of the grid systems are held in proper position by insulation spacing members 12 and 13 and clamped by bolts 14. The terminal extensions for each grid system are in transverse alignment, but the terminal extensions for the different grid systems are positioned in mutually exclusive alignment positions. Such respective alignment facilitates connection of all grid element of a given grid system to a respective common circuit lead 7, 8 or 9 as shown in Fig. 2.

This improved type of construction affords a long path of surface insulation between adjacent line elements of the different grid systems, and the ratio of the effective fluorescent areas of the screen to the total areas of the scanning field is substantially 100 per cent.

Another advantage of the invention over the conventional rotating filter system is the fact that each screen on which a picture is generated is not used to generate any more than one color. In this way the luminous persistence of the screen material can be made longer than otherwise. It is recommended that the persistence be made such that in $1/40$ second the brilliancy drops to about $1/20$. No matter how long is the persistence the colors remain correct on the non-moving parts of the picture. With the rotating filter type of system it was found necessary to increase the number of frames used from 120 per second to 144, mainly to reduce color flicker. This resulted in the increase of the number of color fields from 40 to 48. It is expected that with the invention described here this will not be necessary.

No circuit diagrams accompany this description, since a number of conventional circuits are available to generate the necessary square waves of voltage for the operation of the color grid screen. All other parts of the circuit are the same as in present color television systems. The various dimensional figures given above in describing this invention are primarily for illustrative purposes.

While I have illustrated and described one embodiment of the invention, it should be understood that the invention is not to be limited to the particular embodiment disclosed herein. Modifications apparent to one skilled in the art are to be considered part of the invention as defined in the accompanying claims.

What is claimed is:

1. A luminescent color grid screen for a cathode ray tube composed of a plurality of independent interlaced grid systems, each of said grid systems consisting of mutually insulated electrically conductive line members positioned in parallel arrangement with the line elements of said systems in interlaced juxtapositioned arrangement with corresponding line edges of each line element in substantially one plane, and each of said line members having a luminescent projecting portion whose frontal width substantially subtends the area between two adjacent line elements and electrically in mutually spaced relationship.

2. A luminescent color grid screen for a cathode ray tube composed of a plurality of independent interlaced grid systems, each of said grid systems consisting of mutually insulated electrically conductive thin plate line elements positioned in spaced parallel arrangement with the line elements of said systems in juxtapositioned arrangement with corresponding line edges of each line element positioned in substantially one plane, and a frontal strip portion of each of said plate line elements being positioned at an angle of the order of 45 degrees to the surface of the image screen and the combined areas of all frontal strip portions equaling the total operative image field area of the screen.

3. A luminescent color grid screen for a cathode ray tube composed of a plurality of independent interlaced grid systems, each of said grid systems, consisting of mutually insulated electrically conductive thin plate line elements positioned in spaced parallel arrangement with the line elements of said systems in juxtapositioned arrangement with corresponding line edges of each line element positioned in substantially one plane, a frontal strip portion of each of said plate line elements being bent at an angle to the surface of the image screen and each such frontal portion subtending the area between it and an adjacent element and the frontal strip portions of each of said line elements of a respective grid system being coated with a similar fluorescent material while the elements of different systems are coated with different fluorescent materials.

4. In combination, a cathode ray tube and a luminescent grid screen, the screen comprising a plurality of independent interlaced grid systems of mutually insulated electrically conductive plate line members positioned in spaced parallel arrangement with the line members of respective systems in juxtapositioned arrangement with corresponding line edges of each line member positioned in substantially one plane, the line members of each grid system being electrically connected in parallel, and each of said line members having a luminescent projecting portion whose frontal area substantially overlies the area between adjacent line members, whereby the combined frontal areas of the line members of the said interlaced grid systems are equal to the full image scanning field of the said tube.

5. A luminescent color grid screen for a cathode ray tube composed of a plurality of independent interlaced grid systems, each of grid systems consisting of mutually insulated electrically conductive line members positioned in parallel arrangement with the line elements of said systems in juxtapositioned arrangement, said line members each having an integral terminal extension, the terminal extensions of the line members in each grid system being aligned, the terminal extensions for the different grid systems being disposed in mutually exclusive alignment positions.

6. A luminescent color grid screen for a cathode ray tube composed of a plurality of independent interlaced grid systems, each of said grid systems consisting of mutually insulated electrically conductive line members positioned in parallel arrangement with the line elements of said systems in juxtapositioned arrangement, said line members each having an integral terminal extension, the terminal extensions of the line members in each grid system being in transverse alignment, the terminal extensions for the different grid systems being vertically staggered.

LOUIS W. PARKER.

REFERENCES CITED

The following references are of record in the file of this patent:

UNITED STATES PATENTS

| Number | Name | Date |
|---|---|---|
| 2,301,743 | Nagy et al. | Nov. 10, 1942 |
| 2,307,188 | Bedford | Jan. 5, 1943 |
| 2,446,440 | Swedlund | Aug. 3, 1948 |